(12) United States Patent
Stevens

(10) Patent No.: US 9,941,933 B2
(45) Date of Patent: Apr. 10, 2018

(54) MAGNETO-INDUCTIVE WAVEGUIDE

(75) Inventor: Christopher Stevens, Oxford (GB)

(73) Assignee: ISIS INNOVATION LIMITED, Oxford (GB)

( * ) Notice: Subject to any disclaimer, the term of this patent is extended or adjusted under 35 U.S.C. 154(b) by 705 days.

(21) Appl. No.: 14/126,586

(22) PCT Filed: Jun. 18, 2012

(86) PCT No.: PCT/GB2012/051392
§ 371 (c)(1),
(2), (4) Date: Dec. 16, 2013

(87) PCT Pub. No.: WO2012/172371
PCT Pub. Date: Dec. 20, 2012

(65) Prior Publication Data
US 2014/0111290 A1 Apr. 24, 2014

(30) Foreign Application Priority Data
Jun. 17, 2011 (GB) .................................. 1110273.8

(51) Int. Cl.
H04B 5/00 (2006.01)
(52) U.S. Cl.
CPC ......... H04B 5/0031 (2013.01); H04B 5/0012 (2013.01); H04B 5/0037 (2013.01); H04B 5/0081 (2013.01)
(58) Field of Classification Search
None
See application file for complete search history.

(56) References Cited

U.S. PATENT DOCUMENTS

| 2004/0100343 | A1* | 5/2004 | Tsu ........................ G02F 1/292 335/78 |
| 2010/0066619 | A1 | 3/2010 | Furumura et al. |
| 2012/0217816 | A1 | 8/2012 | Wang et al. |
| 2012/0309316 | A1 | 12/2012 | Edwards et al. |

FOREIGN PATENT DOCUMENTS

| CN | 1886815 A | 12/2006 |
| EP | 1855348 A1 | 11/2007 |
| EP | 2453520 A2 | 5/2012 |
| JP | 2001-092930 A | 4/2001 |

(Continued)

OTHER PUBLICATIONS

M.J. Freire et. al., Planar magnetoinductive wave transducers: Theory and applications, AIP Publishing.*

(Continued)

Primary Examiner — Rexford Barnie
Assistant Examiner — Swarna N Chowdhuri
(74) Attorney, Agent, or Firm — MH2 Technology Law Group, LLP

(57) ABSTRACT

A magneto-inductive waveguide comprising a plurality of resonant elements, the plurality of resonant elements including a first resonant element comprising a conductive loop broken by at least one capacitive gap, and a second resonant element comprising a conductive loop broken by at least one capacitive gap, the second resonant element for magneto-inductively coupling with the first resonant element; wherein the first resonant element and second resonant element are conductively coupled.

13 Claims, 9 Drawing Sheets

(56) References Cited

FOREIGN PATENT DOCUMENTS

| JP | 2007509361 A | 4/2007 | | |
|---|---|---|---|---|
| JP | 2013513277 A | 4/2013 | | |
| WO | 92/21993 | 12/1992 | | |
| WO | 01/69723 | 9/2001 | | |
| WO | WO 0169723 A1 * | 9/2001 | ........... | H01Q 13/085 |
| WO | 2005/031307 A2 | 4/2005 | | |
| WO | 2011/005012 A2 | 1/2011 | | |
| WO | 2011/070352 A1 | 6/2011 | | |
| WO | 2011070352 A1 | 6/2011 | | |

OTHER PUBLICATIONS

International Search Report and Written Opinion dated Aug. 20, 2012 from International Application No. PCT/GB2012/051392 filed Jun. 18, 2012, pp. 1-14.

M. Freire et al. Planar magnetoinductive wave transducers: Theory and applications. Applied Physics Letters, Jan. 1, 2004, vol. 85, No. 19, Melville, NY, U.S.A., pp. 4439-4441.

R. R. Mett et al., "Coupling of Waveguide and Resonator by Inductive and Capacitive Irises for EPR Spectroscopy", Appl Magn Reson., 35(2), 2009, pp. 285-318.

H. Liu et al., "Magnetic Plasmon Propagation Along a Chain of Connected Subwavelength Resonators at Infrared Frequencies", Physical Review Letters, 97, 243902, 2006, pp. 243902-1-243902-4.

Xiaoan Lu et al., "Power Efficient Multimedia Communication Over Wireless Channels", IEEE Journal on Selected Areas in Communications, vol. 21, No. 10, Dec. 2003, pp. 1738-1751.

Japanese Office Action dated May 10, 2016, Japanese Application No. 2014-515294, pp. 1-15 (including English Translation).

Christopher W. T. Chan et al., "Two-Dimensional Magneto-Inductive Wave Data Structures", Proceedings of the 5th European Conference on Antennas and Propagation, Apr. 2011, pp. 1071-1075.

Christopher J. Stevens et al., "Magnetic Metamaterials as 1-D Data Transfer Channels: An Application for Magneto-Inductive Waves", IEEE Transactions on Microwave Theory and Techniques, vol. 58, No. 5, May 2010, pp. 1248-1256.

First Chinese Office Action dated Aug. 26, 2014, Chinese Application No. 201280029506.4, pp. 1-14 (including English Translation).

Japanese Search Report dated Apr. 12, 2016, Japanese Application No. 2014-515294, pp. 1-19 (including English Translation).

E. Shamonina et al., "Magnetoinductive waves in one, two, and three dimensions", Journal of Applied Physics, vol. 32, No. 10, Nov. 15, 2002, pp. 6252-6261.

* cited by examiner

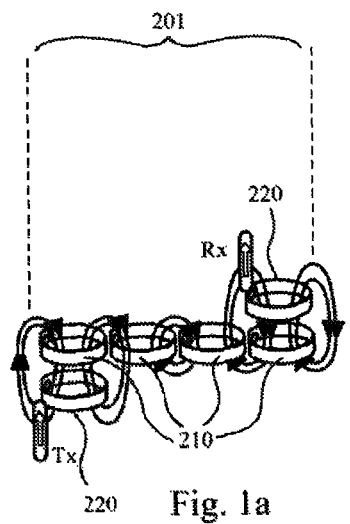
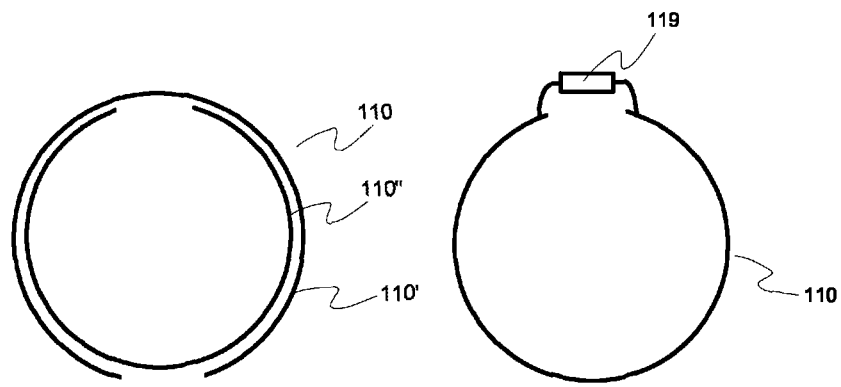
Fig. 1a
Fig. 1b    Fig. 1c

MAGNETO-INDUCTIVE WAVEGUIDE

CROSS-REFERENCE TO RELATED APPLICATIONS

This application is a U.S. National Stage application of International Application No, PCT/GB2012/051392 filed 18 Jun. 2012, which claims priority to Great Britain Patent Application No. 1110273.8 filed 17 Jun. 2011, the entire disclosures of which are hereby incorporated by reference in their entireties.

FIELD OF THE INVENTION

The present invention relates to magneto-inductive waveguides. In particular the invention relates to magneto-inductive waveguides having conductively communicating resonant elements.

BACKGROUND

Power and data connections between electronic devices are typically made by means of cables, and data connections may be made by wireless radio communications devices. Computing devices typically connect with associated accessories and peripherals such as printers, digital cameras, external hard drives and flash drives by Universal Serial Bus (USB) or similar cable interfaces. Microprocessors are generally connected to associated components via multiconductor bus lines defined as tracks on a printed circuit board (PCB) or similar.

A problem associated with cable connections is that they present a trip hazard as well as a potential electrical shock hazard. Thus, cable management systems are typically required. Such systems are particularly important in the workplace and public access areas where health and safety legislation must be complied with. Cable connections are also potentially clumsy and require manual manipulation of a connector fitted to the cable in order to effect a connection. This can be a problem for physically challenged individuals. Repeated connection and disconnection limits the lifespan of connectors due to wear.

In most cases, wireless connections are not suitable for providing power to a device.

STATEMENT OF THE INVENTION

An aspect of the invention provides a magneto-inductive waveguide comprising a plurality of resonant elements, the plurality of resonant elements including a first resonant element comprising a conductive loop broken by at least one capacitive gap, and a second resonant element comprising a conductive loop broken by at least one capacitive gap, the second resonant element for magneto-inductively coupling with the first resonant element; wherein the first resonant element and second resonant element are conductively coupled, and the first resonant element has a size that is around or smaller than $1/20$ times a wavelength of a free space electromagnetic wave having a frequency equal to a resonant frequency of the first resonant element.

The respective conductive loops of the first and second resonant elements may have a common portion, whereby the first and second resonant elements are conductively coupled.

The respective conductive loops of the first and second resonant elements may have a common capacitive gap.

The magneto-inductive waveguide may be arranged such that there is essentially no coupling between the waveguide and free space radiation.

The first resonant element may have a size around or smaller than $1/30$ times the wavelength of a free space electromagnetic wave having a frequency equal to the resonant frequency of the first resonant element.

The first resonant element may have a size around or smaller than $1/100$ times the wavelength of a free space electromagnetic wave having a frequency equal to the resonant frequency of the first resonant element.

The first resonant element may have a size around or smaller than $1/150$ times the wavelength of a free space electromagnetic wave having a frequency equal to the resonant frequency of the first resonant element.

According to some embodiments neither of the first or second resonant elements are coupled to a ground plane.

The magneto-inductive waveguide may comprising conductors arranged along lines of a grid, the conductors defining the plurality of resonant elements, wherein the conductors meet at nodes where lines of the grid intersect, and capacitive gaps are formed in the conductors between pairs of adjacent nodes such that the adjacent nodes are not joined by a conductive path.

The conductors may define the shape of the resonant elements to be one of: square, rectangular or triangular.

The plurality of resonant elements may be arranged to propagate at least one of power or data by a magneto-inductive wave.

The magneto-inductive waveguide may have a dispersion relation given by $$\cos h(\gamma d) = 2Z/(Z - j\omega M)$$

where $\gamma$ is the propagation constant, d is period of the plurality of resonant elements, Z is the impedance of each resonant element, $\omega$ is the angular frequency of the magneto-inductive wave, M is the mutual inductance between the resonant elements, and $j = \sqrt{-1}$.

The plurality of resonant elements may be arranged to be magneto-inductively coupleable to a resonant element of an external device, such that the at least one of power or data may be transferred between the magneto-inductive waveguide and the external device.

Embodiments of the invention have the advantage that input and output devices may be coupled to one another by means of a waveguide at substantially any position of the device. Furthermore, more than two devices can be coupled to the device without a requirement to provide connectors and associated switching electronics.

Some embodiments comprise one or more arrays of resonant circuits coupled by means of an electric field instead of a magnetic field.

An array of magnetically coupled resonators is capable of supporting a propagating electromagnetic wave whose principle components are currents circulating in each circuit and their shared magnetic flux. Such waves have become known as magneto-inductive (MI) waves (see e.g. E. Shamonina, V. E. Kalinin, K. H. Ringhofer and L. Solymar, 'Magneto-inductive waveguide', Electron. Letters 38, 371-3 (2002)).

MI waves only propagate in regions where there are resonant circuits. In a two-dimensional structure the waves therefore decay as $1/r$ in power rather than $1/r^2$ in the case of a three-dimensional structure.

The present invention takes advantage of the fact that the MI waves' local magnetic flux can couple to external devices placed next to the structure supporting the MI waves but only in the near field, close to the structure.

Provided a radius r of resonators of an array are generally small compared with the free space wavelength λ, radiation losses $R_{rad}$ are not significant:

$$R_{rad} \propto \left(\frac{r}{\lambda}\right)^4$$

This has the advantage that devices exploiting MI waves in the near-field regime may be arranged not to emit electromagnetic radiation in the far-field regime, thereby eliminating a requirement for licensing considerations in respect of electromagnetic spectrum transmission bands. Furthermore, shielding may be added if desired, although it is envisaged to be unnecessary in most implementations.

Furthermore, bandwidth can be increased by raising the frequency of operation, the limit to frequency of operation being set by fabrication issues and the complex conductivity of metallic conductors used (of the order of 100s of GHz).

Arrays of coupled resonators supporting MI waves (or corresponding resonators coupled to one another by means of electric field flux lines as opposed to magnetic field flux lines) are similar to 'metamaterials' since they behave as continuous media on free space wavelength scales despite being formed from arrays of discrete coupled elements by which their apparent bulk properties may be engineered.

The device may have a free surface arranged to allow a data transmission or data reception unit to be placed in abutment therewith thereby to effect near-field coupling between the unit and resonant elements of the device.

For example, the resonant elements may be embedded in a host medium such as a sheet of a plastics material, optionally a flexible sheet of plastics material.

It is to be understood that the free surface may be a flat, planar surface, a curved surface, or any other suitable surface.

A plane of each respective loop of the resonant elements of the device may be arranged to be substantially parallel to a portion of the free surface local to the respective loop.

By local is meant a portion of the free surface closest to the respective loop.

Alternatively a plane of each respective loop of the resonant elements of the device may be provided substantially normal to a portion of the free surface local to the respective loop.

A plane of each respective loop of the resonant elements of the device may be provided at an angle in the range from around 30° to around 70°, preferably around 45° to the portion of the free surface local to the respective loop.

Respective adjacent pairs of resonant elements may be arranged such that their respective loop portions are tilted in opposite directions about an axis lying in a plane of each loop portion, respective axes being substantially parallel to one another.

Respective adjacent pairs of elements may be oriented substantially normal to one another.

The device may comprise first and second layers of resonant elements.

A plane of each respective loop of resonant elements of the first layer may be substantially parallel to a plane of each respective loop of resonant elements of the second layer.

Alternatively a plane of each respective loop of resonant elements of the first layer may be substantially normal to a plane of each respective loop of resonant elements of the second layer.

The device may comprise a third layer of resonant elements, the first and third layers being arranged to sandwich the second layer therebetween.

Each respective loop of resonant elements of the third layer may be parallel to a corresponding loop of a resonant element of the first layer being a resonant element above each respective loop of the third layer.

Resonant elements of the first layer of may have a different resonant frequency to resonant elements of the second layer.

The resonant frequency of the coupling element of the data transmission unit or data reception unit may be different from the resonant frequency of the resonant elements of the first and second layers.

The presence of a coupling portion of a data transmission unit or data reception unit in a suitable orientation above the first layer of resonant elements may be arranged to cause a shift in a resonant frequency of one or more resonant elements of the first layer whereby a resonant element of the second layer and the coupling element of the data transmission unit or data reception unit become coupled.

This has the advantage that an ease with which an unauthorised party may couple a resonant element to the device may be reduced.

A resonant element of the device may be arranged to become disabled whereby the resonant element is no longer coupled to one or more adjacent resonant elements in the event that a magnitude of a current flowing in the loop portion of the resonant element exceeds a prescribed value.

This has the advantage that in some cases if an unauthorised party seeks to couple a resonant element to the device the device may be caused to become disabled. The device may be arranged to be caused to become permanently disabled (a one-shot arrangement). Alternatively the device may be arranged to be caused to become reversibly disabled.

A resonant element of the first layer of the device may be arranged to become disabled in the event that a magnitude of a current flowing in the loop portion thereof exceeds a prescribed value.

The device may further comprise a third layer of resonant elements, the first and third layers being arranged to sandwich the second layer therebetween.

The first and third layers may be arranged to enhance a coupling of a transmitted signal through the structure.

Respective planes of loop portions of coupling elements of the first and third layers may be substantially parallel.

Respective planes of loop portions of coupling elements of the first and third layers may be substantially normal to corresponding planes of loop portions of the second layer.

The data transmission unit and the data reception unit may be arranged to communicate with one another by means of magneto-inductive (MI) waves.

Alternatively or in addition the data transmission unit and the data reception unit may be arranged to communicate with one another by means of electro-inductive (EI) waves.

The resonant elements of the common communications device may be provided on or within a substrate.

The substrate may comprise one selected from amongst a plastics material and a fabric.

The substrate may be a flexible substrate.

A product comprising the waveguide may be a product selected from amongst an article of clothing, a piece of carpet, a piece of wallpaper, a construction panel, a fluid conduit, a circuit board, a mother board and an integrated circuit.

An embodiment of the invention provides transportation apparatus having a waveguide according to the invention provided on or in a portion of a structure thereof.

Preferably the structure is one selected from amongst a hull of a vessel, a fuselage of an aircraft, a body of a motor vehicle and a cab of a motor vehicle.

BRIEF DESCRIPTION OF THE DRAWINGS

Embodiments of the invention will now be described with reference to the accompanying figures in which:

FIG. 1 shows (a) a 1-D array of plane-coupled resonant circuits providing a common communications device (or 'channel'); (b) shows an example of a resonant circuit suitable for use in the arrangement of FIG. 1(a); (c) shows another example of a resonant circuit suitable for use in the arrangement of FIG. 1(a).

DETAILED DESCRIPTION

Figure 2:
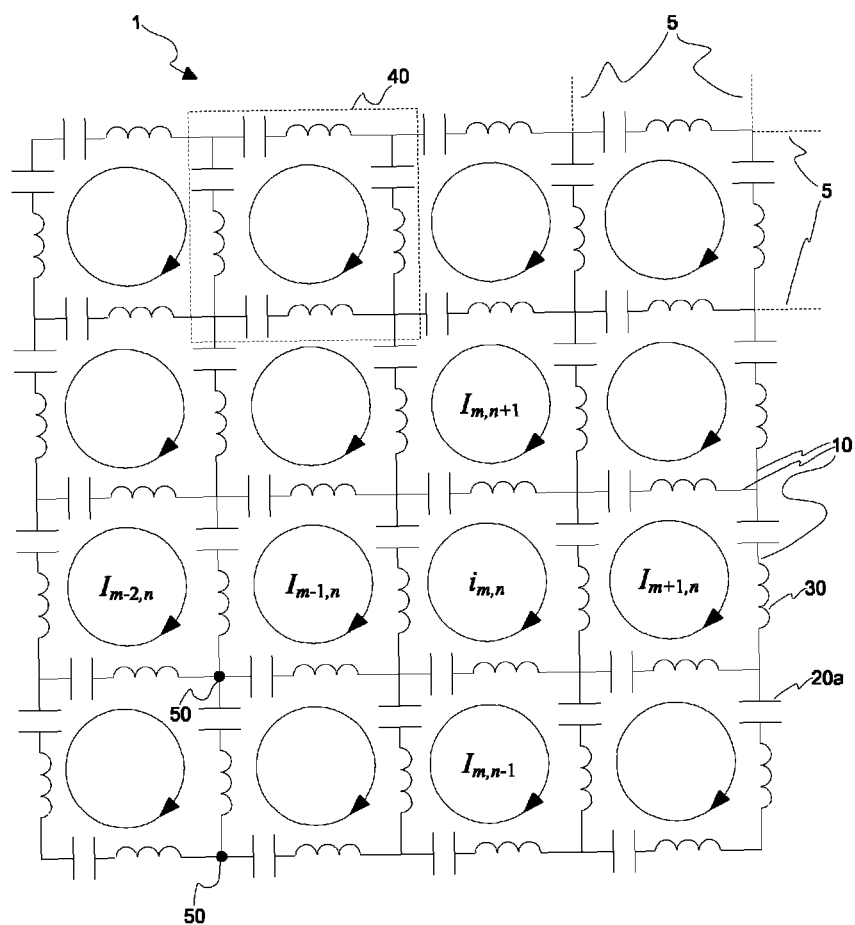
FIG. 2 is a circuit diagram representation of an embodiment of the present invention.

To address problems of wired connections described above, patent applications GB 0921401.6 and PCT/GB2010/052040, both of which are incorporated herein by reference, disclose a plurality of magneto-inductively (MI) coupled resonant circuits, each of which may be formed of a split ring with a gap bridged by a capacitor.

FIG. 1a shows an example of such a device having an array 201 of plane-coupled resonant circuits 210 that are coupled via magnetic flux generated by electric currents induced in loop portions of the respective circuits 210. Here plane or planar coupling between a pair of resonant circuits means that a nominal line connecting a centre of each loop of the pair has at least a non-negligible component parallel to a plane of each loop as shown also in FIG. 1a. Other arrangements, in which the resonant circuits are axially coupled, for example, are also possible, as explained in patent applications GB 0921401.6 and PCT/GB2010/052040.

FIGS. 1b and 1c show examples of resonant circuits compatible with the arrangement of FIG. 1a. FIG. 1b shows a resonant circuit 110 having a pair of concentric split ring resonators 110' and 110". The split ring resonators 110', 110" are each in the form of a discontinuous ring element having a pair of free ends defining a gap. In some embodiments the gap is an air gap. In some embodiments a medium other than air is provided between the free ends. In the embodiments of FIG. 1b the respective gaps of the resonators are oriented at 180° with respect to one another. In the embodiment of FIG. 1c a resonant circuit 110 is provided having a single split ring, free ends of the ring being connected by means of a capacitor 119. The resonators may also take other forms, such as that of a spiral split ring.

FIG. 1a also shows resonant circuit 220 of a transmitter unit, which may be a separate device. A signal Tx is delivered to the transmitter unit's resonant circuit (e.g. by a wired connection) and transferred to a resonant circuit 210 of the array 201 by MI coupling. The signal then propagates through the array by MI coupling. When a receiver unit, which may be a separate device, having a resonant circuit 220 is placed in proximity to the array 210, the signal propagated through the array may be received by the resonant circuit 220 of the receiver unit by MI coupling. The signal may then be carried by a wired connection from the resonant circuit 220 of the receiver unit.

Communication with transmitter and receiver units can make use of axial coupling or planar coupling, or some other arrangement.

In the arrangement of FIG. 1, variation of the coupling coefficient as a function of separation between resonant particles shows an increasing pass-band in the vicinity of the resonant frequency as κ (the in-plane coupling coefficient) increases. For an infinite structure, the pass-band (i.e. the region over which the magnitude of attenuation, α, is substantially at a minimum) increases roughly linearly with increasing coupling. For a finite structure, reflections and standing waves are likely to play a role and the pass-band becomes modulated with discrete peaks.

Devices communicating with one another by means of the array of FIG. 1 may be arranged to select a frequency of transmission and/or reception of a signal according to one or more characteristics of the array such as a position of one or more peaks of the pass-band.

Ends or edges of the structure of FIG. 1 may be terminated by a complex impedance or a series of impedances in order to reduce an amount of reflected signal, see e.g. Syms et al, 'Absorbing terminations for magneto-inductive waveguides', IEE Proceedings—Microwaves Antennas and Propagation 152, pp 77-81 (2005).

The arrangement of FIG. 1 permits a signal (e.g. data or power) to be transmitted between devices without requiring a conductive electrical connection between the devices. This address the limitations of electrical connectors described above. In addition the above arrangement may be configured to provide power to a device.

As the above arrangement does not require exposed conductive elements to make a connection, the provision of waterproof connectors may be greatly simplified.

Furthermore, wired connections to microprocessors and similar components require complex connections and precise registration between the connectors, which leads to increased complexity and cost of production. The above arrangement may be applied to simplify connections of such components, as conductive electrical connections need not be formed.

In typical wireless communications security may be reduced, as the communication may be received by third parties that are not the intended recipients. Furthermore, some wireless communication methods may require a licence in some jurisdictions. As the above arrangement makes use of short-range MI coupling, these problems may be avoided or reduced.

The above arrangement also provides an alternative to conductive wired connections.

MI waves propagating in the array 201 described above suffer from attenuation. Waves in the array 201 are propagated only at frequencies within a device-dependent bandwidth.

Embodiments of the present invention have the object of addressing one or more limitations or shortcomings associated with conventional wired connectors, wireless connectors, and/or the array 201.

FIG. 2 shows an equivalent circuit diagram of a MI waveguide 1 according to an embodiment of the present invention. FIG. 2 may be described as a continuous grid of capacitive components 20a forming a mesh or grid.

Figure 3A:
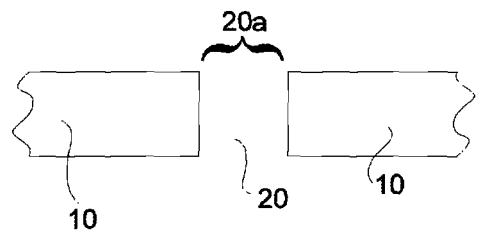
FIGS. 3(a) and (b) illustrate examples of capacitive elements suitable for use with the arrangement of FIG. 2.
Figure 3B:
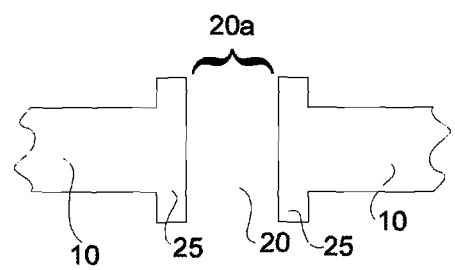

According to the embodiment of FIG. 2 a plurality of conductors 10 form a MI waveguide 1. The conductors 10 are arranged in a grid, with intersections of lines 5 of the grid forming nodes 50. Between each pair of adjacent nodes 50, that is nodes 50 that are connected by a line of the grid 5, a capacitive element 20a is provided. This may take the form of a capacitive gap 20. The grid defines loops, in the case of FIG. 2 the loops are square, with each loop having four sides, and each side having a capacitive element 20a, which breaks the loop. FIG. 2 also shows inductive elements 30 on each side of the loop. In a preferred embodiment these inductive elements represent the inductance arising from the configuration of the conductors 10 into loops, and no separate or additional inductive element is needed, In other embodiments, a separate or additional inductive element may be provided, The capacitive gap 20 may be a space, break or gap in the conductor, as shown in FIG. 3a. The capacitive gap 20 could also have 1D capacitive "plate" portions 25 to increase the capacitance, as shown in FIG. 3b. Other arrangements would occur to the skilled person, and the invention is not particularly limited by the arrangement of the capacitive element 20a.

Each loop forms a resonant element 40 that will resonate when stimulated by a magneto-inductive wave within a particular set of frequencies. The resonant element 40 formed by the loop is arranged to couple magneto-inductively with neighbouring loops, in a similar manner to the loop portions 210 in the array 201 of FIG. 1. However, the loop portions 210 of FIG. 1 are electrically isolated from each other, coupling only via their mutual inductances. In contrast, according to the present embodiment, neighbouring resonant elements 40 are also conductively coupled, that is electrical currents can flow directly between the resonant elements 40, or respective portions of the resonant elements 40.

In the case of FIG. 2, the conductive coupling between the resonant elements 40 is achieved by the resonant elements 40 sharing sides. In this case, this means that the loops of neighbouring resonant elements 40 have a common (shared) conductive portion. According to the present embodiment, neighbouring resonant elements 40 also have a common (shared) capacitive element 20a.

The MI coupling between resonant elements 40 may extend beyond nearest neighbours, to next-nearest neighbour and possibly to more distant resonant elements 40.

In preferred embodiments, the MI waveguide 1 has no ground plane, such that the resonant elements 40 are not coupled to a ground plane. The presence of a ground plane reduces the strength of the mutual inductive coupling between adjacent resonant elements 40. This would narrow the bandwidth of the waveguide 1 and make the waveguide 1 lossy.

Preferably, the MI waveguide 1 is arranged such that the free space wavelength of radiation having a frequency at which the resonant elements 40 resonate (herein referred to simply as the free space wavelength) is much larger than the size of the individual resonant elements 40. When this condition is satisfied, interactions between the waveguide 1 and free space radiation are reduced, thereby reducing radiation losses. Ideally there would be no interaction between the waveguide 1 and free space radiation. Such interaction can be made very weak, and may become negligible, by arranging the resonant element 40 size sufficiently smaller than the free space wavelength. For example, the resonant element 40 size may be less than $\frac{1}{20}$ of the free space wavelength, and is preferably less than $\frac{1}{30}$ of the free space wavelength. According to a specific example of the embodiment of FIG. 2, the resonant elements 40 are 1 cm squares with resonant frequencies around 400 MHz, and the corresponding free space wavelength is 75 cm, i.e. 75 times greater than the resonant element 40 size.

In a preferred embodiment, the resonant element 40 size may be less than $\frac{1}{100}$ of the free space wavelength. In a more preferred embodiment, the resonant element 40 size may be less than $\frac{1}{150}$ of the free space wavelength. A resonant frequency of 350 MHz is preferred with these embodiments, but other values may be used. As would be apparent to the skilled person, the resonant frequency of the resonant elements 40 may be controlled in various ways, for example by selection of the size of the capacitive gap or capacitor plates (where provided), or by controlling the self-inductance of the element.

The size of the resonant elements 40 in the embodiment of FIG. 2 corresponds to the distance between adjacent nodes 50 of the grid. Depending on the geometry of the resonant elements 40 other measures of size may be appropriate, as would be understood by a skilled person. Here, size relates to the relevant linear measure of the resonant elements 40 when considering the interaction of the resonant element 40 with free space waves.

The embodiment of FIG. 2 has square resonant elements 40, but the shape of the resonant elements is not particularly limited. In other embodiments the resonant elements may be rectangular, triangular, etc. The resonant elements within a waveguide may have different sizes and shapes, but in preferred embodiments of the waveguide the resonant elements have the same size and shape. The resonant elements are preferably regular polygons, but are not limited to this.

In some embodiments, devices communicating with one another by means of the waveguide may be arranged to select a frequency of transmission and/or reception of a signal according to one or more characteristics of the waveguide such as a position of one or more peaks of the pass-band.

In some embodiments, ends or edges of the structure may be terminated by a complex impedance or a series of impedances in order to reduce an amount of reflected signal, see e.g. Syms et al, 'Absorbing terminations for magneto-inductive waveguides', IEE Proceedings—Microwaves Antennas and Propagation 152, pp 77-81 (2005).

Figure 4:
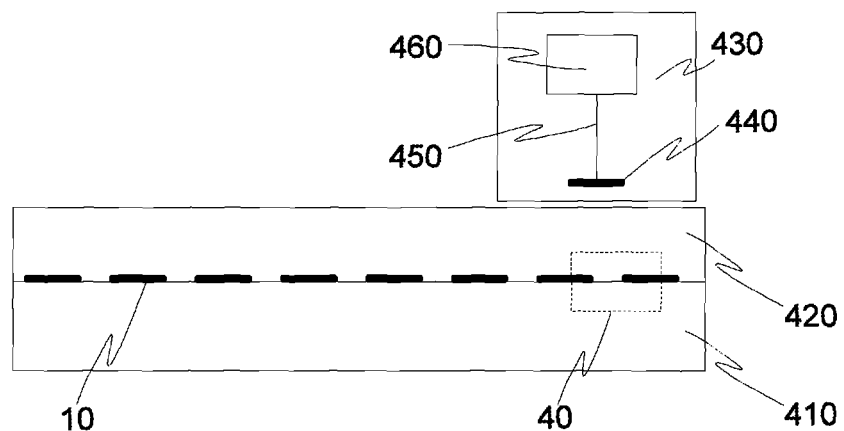
FIG. 4 illustrates a waveguide and external device.

Waveguides according to the embodiments of the present invention may be produced by printing conductive patterns onto a substrate 410 or by lithography. Other methods would occur to the skilled person and may be suitable depending on the size, resistance and other properties required of the conductors and other components. The conductors may be formed of copper or any other suitable conductive material. In some cases semiconducting material may be suitable. Selection of a suitable substrate 410 is within the ability of the skilled person. The substrate 410 is preferably a dielectric substrate. In some embodiments a superstrate 420 (preferably dielectric) may be provided to enclose the conductors 10, protecting and insulating the conductors 10, as shown in FIG. 4. Where it is desirable to prevent coupling to the resonant elements 40 by an external device in some portions or on one side of the waveguide, an insulating substrate that is not a dielectric may be used in those portions or on that side of the waveguide 1.

As illustrated in FIG. 4, communication between the waveguide 1 and an external device 430 may be achieved by placing an external device having a suitable resonant element 440 in proximity to a resonant element 40 of the waveguide 1, so that the resonant element 440 of the external device 430 couples magneto-inductively with the resonant element 40 of the waveguide 1. A wired connection 450 may transfer power or data between the resonant element 440 of the external device 430 and other components 460 of the external device 430. Other arrangements are possible within the external device 430. For example, the external device 430 could make use of a MI waveguide to carry the power or signal between the resonant element 440 and the components 460.

The resonant element 440 of the external device 430 may be any resonant element suitable for magneto-inductively coupling with a resonant element 40 of the waveguide 1. For example, the resonant element 440 could be an element of a waveguide according to the present invention. The resonant element could also be arranged as a loop portion as illustrated in FIG. 1, for example.

In embodiments of the invention, coupling between the resonant element 440 of the external device 430 and the resonant element 40 of the waveguide 1 may be achieved by various configurations. For example, the resonant element 440 may be positioned substantially in the plane of the resonant element 40. The plane of resonant element 440 is illustrated as being parallel to the plane of resonant element 40, but could be perpendicular or at some intermediate angle. Provided the resonant elements 40, 440 are able to couple with each other the relative position and angle are not limited.

In some embodiments one or more of the resonant elements 40 of the waveguide 1 may be provided with conductive connections (wired connections) to other elements, such as processors or conductive connectors. This allows data and power to enter and/or exit the waveguide 1 by means other than MI coupling.

Figure 5A:
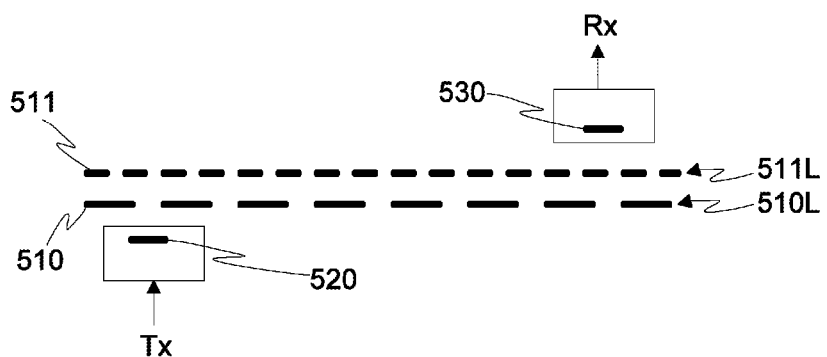
FIG. 5 shows (a) a further embodiment in which two layers of resonant circuits are provided and (b) a corresponding plot of S21 as a function of frequency.
Figure 5B:
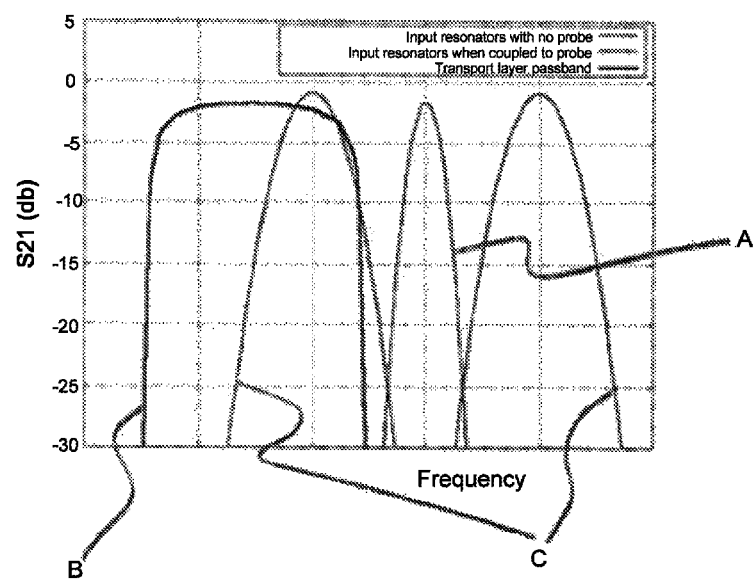

A further embodiment of the invention is shown in FIG. 5(*a*). In the embodiment of FIG. 5(*a*) two layers of resonators are provided. Resonators 510 of one layer being a transmission layer 510L are arranged to support propagation of MI waves along a line or plane defined by the resonators 510. Resonant circuits 511 forming an interface layer 511L are provided in a plane parallel to the transmission layer 510L. The resonant circuits 511 of the transmission layer are arranged to facilitate coupling of the resonators of the transmission layer 410L to a resonator 520, 530 of an external device (e.g. a transmitter or receiver unit).

The resonant circuits 511 of the interface layer 511L are arranged to be less strongly coupled to one another than resonators 510 of the transmission layer 510L.

A resonant frequency of resonators 511 of the interface layer 511L is arranged to be out of the MI wave pass-band of the transmission layer 510L such that substantially no coupling of power out from the transmission layer 510L to the interface layer 511L occurs in the absence of a coupler of a suitable transmission or reception unit.

FIG. 5(*b*) schematically illustrates power transfer functions, S21 (dB), as a function of frequency. Trace A corresponds to a pass-band of resonators of the interface layer 511L in the absence of an external coupler 520, 530 such as a coupler of a receiver unit or a transmitter unit. Trace B corresponds to a pass-band of resonators of the transmission layer 510L.

If a coupler of a suitable transmission or reception unit 520, 530 is present in the vicinity of the interface layer 511L, coupling between the coupler of the unit and the interface layer 511L is arranged to occur. This is because the presence of the coupler of the transmission or reception unit 520, 530 results in a shifting of the pass-band of the interface layer 511L such that overlap of the pass-bands of the interface layer 511L and transmission layer 510L occurs. This is illustrated in FIG. 5(*b*) where trace C shows a splitting of the pass-band of the interface layer 511L whereby two discrete pass-bands labelled C can now be identified. Thus, the pass-band of the interface layer 511L is shifted into the transmission layer 510L MI wave pass-band range (illustrated by trace B).

Under such circumstances the coupler of a unit can inject signals into the transmission layer 510L but the resulting MI wave cannot couple back to the interface layer 511 unless a suitable coupler (such as that of another suitable transmission or receiver unit) is present in the vicinity of the interface layer 511L.

Embodiments of the invention having this feature have the advantage that power is only transmitted to the interface layer 511L at locations where a coupler of a suitable transmitter or receiver device is located thereby reducing an amount of power lost from an MI wave propagating in the transmission layer 510L.

According to the embodiments of the present invention, at least one of the transmission layer 510L and interface layer 511L includes a waveguide 1 according to an embodiment of the present invention. Preferably at least the transmission layer 510L is a waveguide 1 according to an embodiment of the present invention. One of the transmission layer 510L or interface layer 511L may have an alternative structure, such as that shown in FIG. 1.

In some embodiments, the resonant elements 40 of the waveguide 1 may be corrugated, e.g. by being provided on a corrugated substrate 610, such that individual resonant elements 40 are not planar, or such that planes of neighbouring resonant elements 40 in at least one direction are not parallel. This may reduce constraints on coupling geometry when coupling to an external object.

Figure 6A:
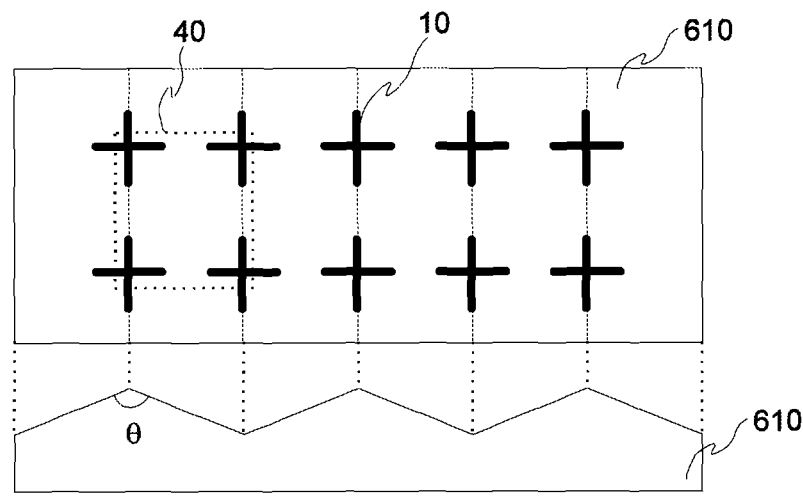
FIG. 6 shows (a) top and side views of an embodiment in which resonant circuits are provided in a non-coplanar, corrugated manner; (b) top and side views of an embodiment in which resonant circuits are themselves non-planar

FIG. 6*a* shows a plan and side elevation of an example of a corrugated substrate 610 arranged such that the neighbouring resonant elements are not parallel in the direction of the corrugations (herein this refers to the direction perpendicular to the ridges of the corrugations).

Thus, planes of respective resonant elements 40 adjacent in the direction of corrugation are inclined at an angle θ with respect to one another. θ may be substantially 90°. Other values of θ may also be used. Some values of θ may provide an increased data capacity with respect to other values. The resonant circuits 40 may be tilted at 45 degrees to the plane of the substrate.

The above arrangement allows resonant elements 440 of external devices 430 to couple to the resonant elements 40 of the waveguide 1 at a range of different angles. For example, a resonant element 440 of an external device 430 may be oriented such that a longitudinal axis of the resonant element 440 is substantially parallel to a longitudinal axis of the waveguide 1. Alternatively, a longitudinal axis of a resonant element 440 of a receiver may be oriented substantially normal to a longitudinal axis of the waveguide 1.

Figure 6B:
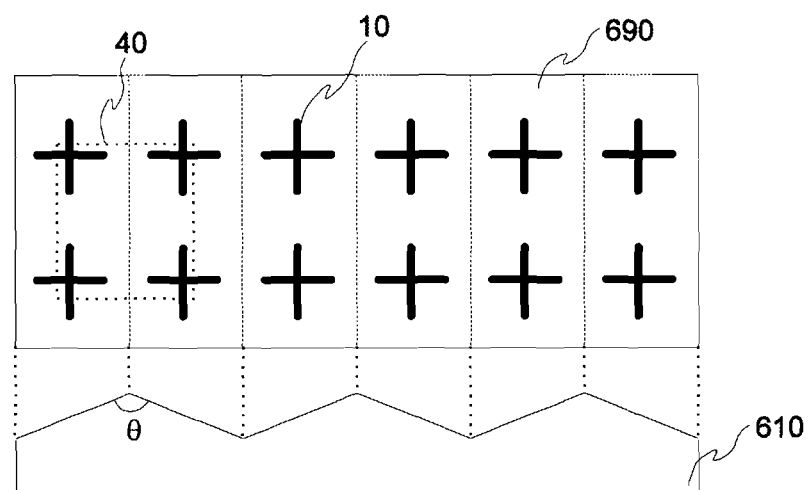

FIG. 6*b* shows a plan and side elevation of an example of a corrugated substrate 610 arranged such that at least some of the resonant elements 40 are not planar.

In FIGS. 6*a* and 6*b* the corrugations have the same periodicity as the resonant elements, but this is not essential, and the corrugations may have different periodicity from the resonant elements.

Figure 7:
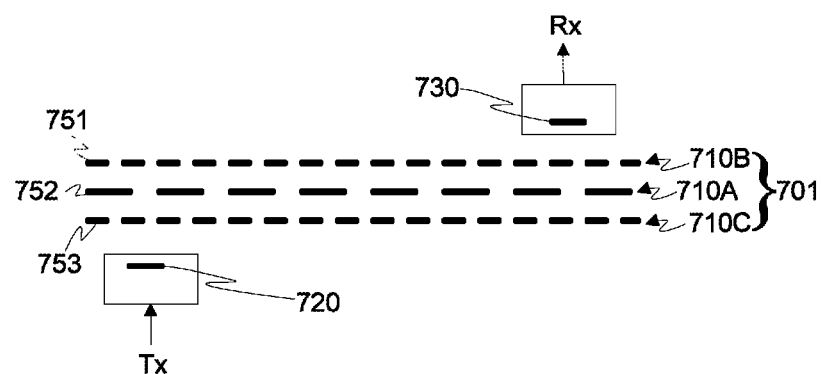
FIG. 7 shows an embodiment having three layers of resonant circuits.

FIG. 7 shows an embodiment of the invention having three layers 751, 752, 753 of resonant elements. Each layer comprises a sub-array of resonant circuits 710A, 710B, 710C respectively.

The outer pair of layers (shown as the top and bottom layers 751, 753 in FIG. 7) are arranged to enhance a coupling between resonant elements 720, 730 of respective external units 725 and 735 (shown as transmitter and receiver units, respectively), by virtue of their strong interaction with the middle layer 752 as described above with respect to FIG. 5. Coupling between the resonant circuits in the outer layers 751, 753 is enhanced by their strong interaction with the middle layer 752.

This arrangement may lead to an increased bandwidth. For example, in some arrangements the bandwidth may be increased by around a factor of two by virtue of the enhanced coupling described above.

Figure 8:
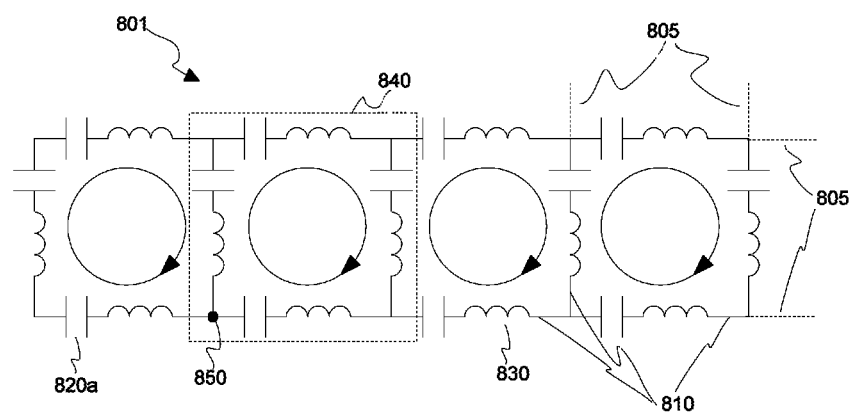
FIG. 8 shows a one-dimensional array of resonant circuits according to an embodiment.

FIG. 8 illustrates an embodiment of the invention having a one-dimensional array of resonant circuits, the circuits being analogous to those of FIG. 2. Modifications of the arrangement of FIG. 2, such as those shown in FIGS. 4, 5, 6 and 7 can also be applied to the embodiment of FIG. 8.

Some embodiments of the invention provide smart devices. For example, devices may be arranged to change a range of a pass-band of the waveguide 1 in real time. For example, variable capacitors may be incorporated into the resonant elements of the device. In some embodiments a dielectric constant of a medium may be changed, to vary the range of the pass-band.

In some embodiments of the waveguide may be employed in integrated circuit devices (ICs). For example, coupling of power and/or signals to and from the IC, or even within the IC, by means of MI waves. In some embodiments one or more resonators may be provided on the IC and arranged to couple to one or more corresponding resonators provided on a circuit board or other substrate to which the IC is attached or otherwise provided in proximity with. Power may thereby be transferred to the IC and data signals, control signals and any other required signals transmitted between the IC and substrate. Components of a computing device incorporating such a substrate may be arranged to communicate with one another using an embodiment of the waveguide. For example, storage devices, random access memory devices, graphics processor devices and any other devices or circuits may be arranged to communicate by means of the waveguide. This has the advantage of eliminating a requirement for expensive and delicate mechanical connectors for mounting components to a PCB.

Figure 9:
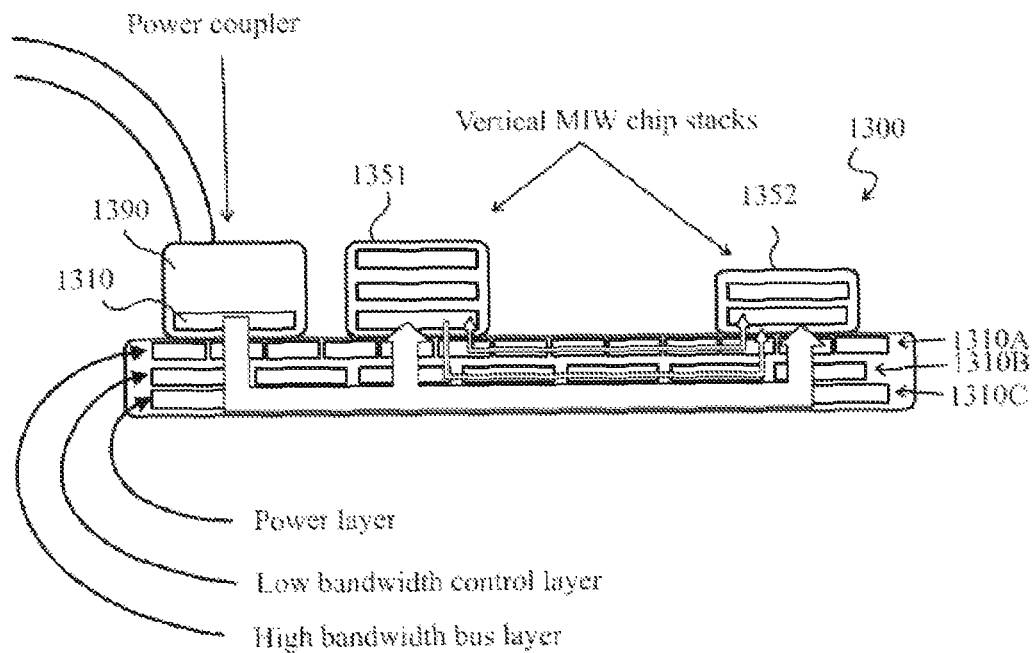
FIG. 9 shows an embodiment having three layers of resonant circuit elements arranged to convey power, control signals and data signals, respectively.

FIG. 9 shows an arrangement of apparatus in which a common communications device 1300 is provided having three layers of resonant circuit elements 1310A, 1310B, 1310C respectively.

A first layer 1310A (also referred to as a data layer 1310A) is arranged to provide a high bandwidth bus layer carrying communications signals.

A second layer 1310B (also referred to as a control layer 1310B) is arranged to provide a relatively low bandwidth control layer carrying control signals. It is to be understood that a bandwidth of a communications channel for control signals can typically be less than that of a communications data channel. The control layer may for example convey signals associated with the control of a device or circuit coupled to the communications device 1300.

A third layer 1310C (also referred to as a power layer 1310C) is arranged to convey power to a unit coupled to the device 1300. Power is provided to and from the power layer 1310C by means of electromagnetic induction.

In the embodiment shown in FIG. 9 power is coupled to the power layer 1310C by a power coupler 1390 in the form of a terminal having a resonant circuit element 1310 arranged to couple power to the power layer 1310C.

Similarly, control signals may be coupled to the control layer 1310B and data signals coupled to the data layer 1310A by respective resonant circuits.

It is to be understood that a resonant frequency of resonant circuits 1310 of the data, control and power layers 1319A, 1310B and 1310C respectively are arranged to be sufficiently different that an amount of cross-communication of data, control and/or power signals is as low as possible.

In some embodiments units such as chip stacks 1351, 1352 are provided on the common communications device 1300 and arranged to be powered thereby and to communicate therethrough. The chip stacks 1351, 1352 may comprise one or more integrated circuits such as memory circuits, microprocessor circuits etc. Each stack 1351, 1352 is provided with a respective resonant circuit element arranged to couple to a respective layer 1310A, 1310B, 1310C of the device 1300. Each resonant circuit element of the stack 1351, 1352 is provided with a suitable filter element to enable filtering out of signals picked up by the circuit element not carrying a signal corresponding to that which the particular resonant circuit element is intended to pick up. Thus, the resonant circuit element of the stack 1351, 1352 corresponding to the data layer 1310A is arranged not to pick up any signals from the control layer 1310B and power layer 1310C.

Any signals from the control or power layers 1310B, 1310C picked up by the resonant circuit element of the stack 1351, 1352 corresponding to the data layer 1310A is filtered out by a suitable filter.

According to some embodiments one or more of the layers 1310A, 1310B and 1310C may be formed of resonant elements according to FIG. 1. At least one of the layers 1310A, 1310B and 1310C is arranged such that the resonant elements are conductively coupled, as in FIG. 2, for example.

Figure 10:
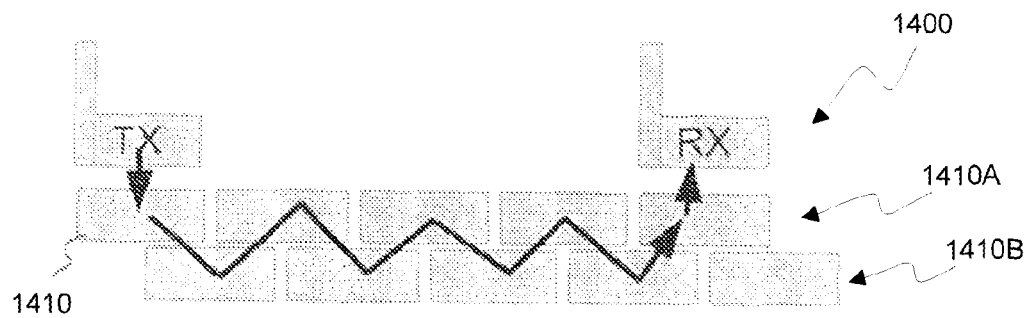
FIG. 10 shows a common communications device having an arrangement of resonant circuit elements which may be described as a 'brick wall' arrangement.

FIG. 10 shows a common communications device 1400 having an arrangement of resonant circuit elements 1410 which may be described as a 'brick wall' arrangement. In the embodiment shown, the device has two layers 1410A, 1410B of resonant elements. The resonant elements of at least one of the layers are conductively coupled (as in FIG. 2, for example). The resonant elements 1410 of each layer are substantially coplanar, resonant elements of respective layers being in a staggered relationship with one another in a similar manner to bricks of a brick wall structure. Thus the elements 1410 of respective layers 1410A. 1410B may be described as out of phase with one another by substantially 180°.

The arrangement shown in FIG. 10 has the advantage that increased in-plane coupling of resonant elements may be obtained via alternate vertical coupling of elements. This has the effect of increasing a bandwidth of the communications device 1400 for in-plane signals.

Embodiments of the present invention may include a flexible substrate to produce a physically flexible device. Such devices can be fabricated in a relatively simple manner. In some cases the coupling performance may vary when the inter-resonator geometry changes. In some embodiments, the resonators are sufficiently small that the angle between individual resonators in the chain is sufficiently small that coupling performance is maintained, in particular, over the expected range of deformation of the substrate.

An example of an application of embodiments having flexible substrate is a linear array of resonant circuits coupled to a person's body. In some embodiments the circuits are embedded in or otherwise coupled to one or more articles of clothing. Such an array of circuits provides a body network, allowing devices coupled to or in close proximity to the body of a user to communicate with one another wirelessly. For examples, a mobile telephone device may be provided in electrical communication with a headset by means of the array of circuits, the resonant circuits being substantially planar-coupled to one another. Systems, such as Bluetooth, that are currently used for wireless communication between devices, suffer from limited capacity in crowded locations. According to embodiments of the invention, non-radiative local data transfer channels are used, which provide enhanced security and avoid the problems of limited capacity in crowded locations. With this arrangement, for example, power and data storage portions of a device may be provided at separate locations on the body from to a portable device, with power and data being communicated to the device via the array of circuits.

Devices can be fabricated in substantially any planar non-conducting surface, including LCD screens, clothing, medical implanted devices, surfaces of vehicles and boats including a hull of a boat, ships, submersibles, PC and laptop cases, printed circuit boards, books, advertising posters and any other suitable non-conducting surface. Thus for example devices may be provided on a PCB to replace bus lines used to communicate data between integrated circuits coupled to the PCB.

In some embodiments a waveguide is provided that is arranged to allow a user to touch a communications or storage device such as a mobile phone, music player and/or video player against a portion of the waveguide to download data. For example, a user may touch a mobile device against a poster at a cinema and download a movie trailer corresponding to the poster.

Waveguide devices according to embodiments of the invention may be provided in a range of structures such as carpets, carpet tiles, wallpapers, boards for fabricating buildings, on or around cables, pipes, other conduits and any other suitable structure. Waveguides according to embodiments of the invention may be used in common communications devices.

Embodiments of the invention differ from the arrangement of FIG. 1, in which the resonant elements are electrically isolated from one another and couple only via their mutual inductances. Embodiments of the present invention have resonant elements formed by loops of a mesh. The loops are formed by connected capacitors and have an inductance, as well as mutual inductance with their neighbours. Terminal arrangements described in patent applications GB 0921401.6 and PCT/GB2010/052040 may be used with the embodiments of the present invention.

The Kirchoff equation for the embodiment of FIG. 2 is:

$$0 = 4Zi_{m,n} + (j\omega M_1 - Z)[i_{m-1,n} + i_{m+1,n} + i_{m,n-1} + i_{m,n+1}]$$

Where $Z=R+j\omega L+1/(j\omega C)$, $M_1$ is the nearest neighbour mutual inductance, $i_{x,y}$ is the current in loop x,y. R, L and C are respectively the resistance, impedance and capacitance of each side of the loop. $\omega$ is the angular frequency, and $j=\sqrt{(-1)}$.

This is similar to the Kirchoff equation of the first order coupled magneto-inductive wave device shown in FIG. 1, with an additional coupling produced by the impedance term Z. The dispersion equation for the structure of FIG. 2 is:

$$\cos h(\gamma d) = 2Z/(Z - j\omega M).$$

By comparison, the dispersion equation for the arrangement of FIG. 1 is:

$$\cos h(\gamma d) = 2Z/(j\omega M).$$

Figure 11:
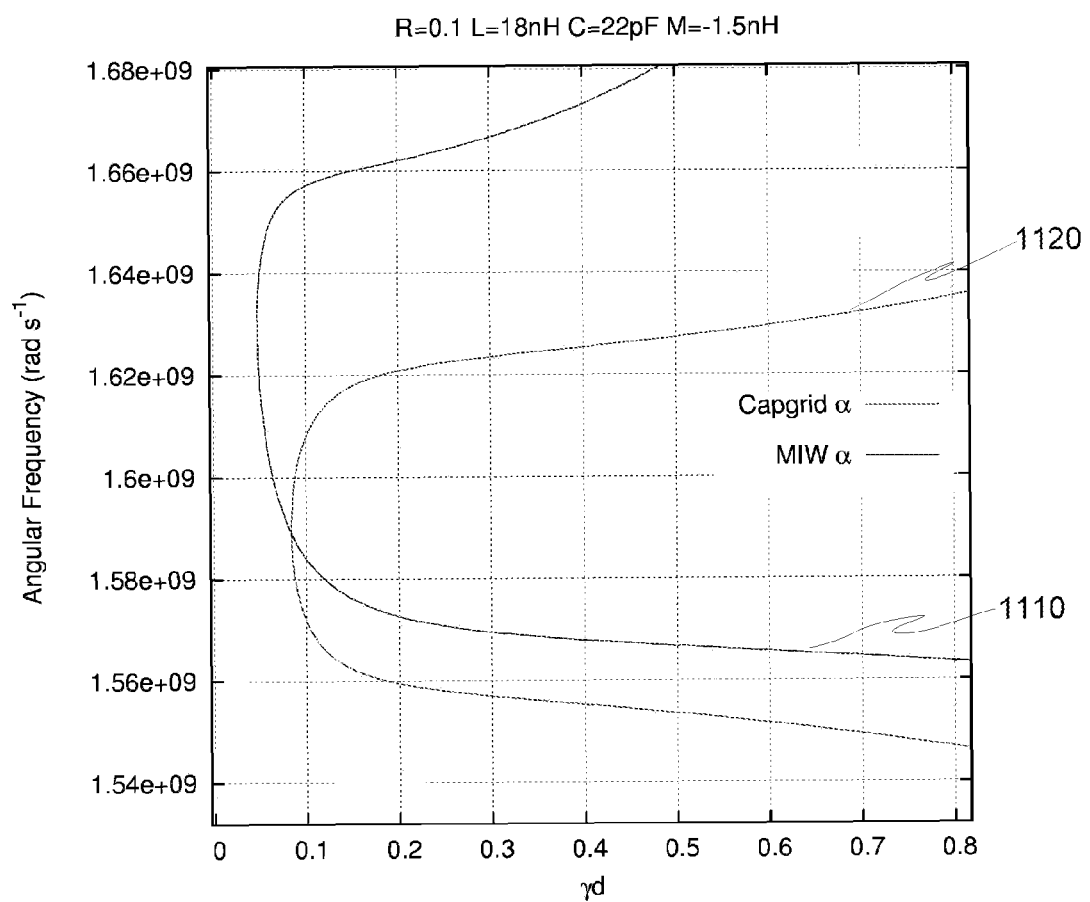
FIG. 11 shows attenuation constants for arrangements according to FIGS. 1 and 2.

Here $\gamma$ is the propagation constant and d is the period of the resonant elements (e.g. the period of the grid in FIG. 2, defined by the distance between neighbouring nodes). The attenuation constants can be derived from the real part of the dispersion equations, and are shown in FIG. 11 for typical values. The attenuation constant for the arrangement of FIG. 1 is shown as line 1110, while that of the arrangement of FIG. 2 corresponds to line 1120. As can be seen, the arrangement of FIG. 2 has less than half the attenuation at mid band compared with the arrangement of FIG. 1.

Figure 12:
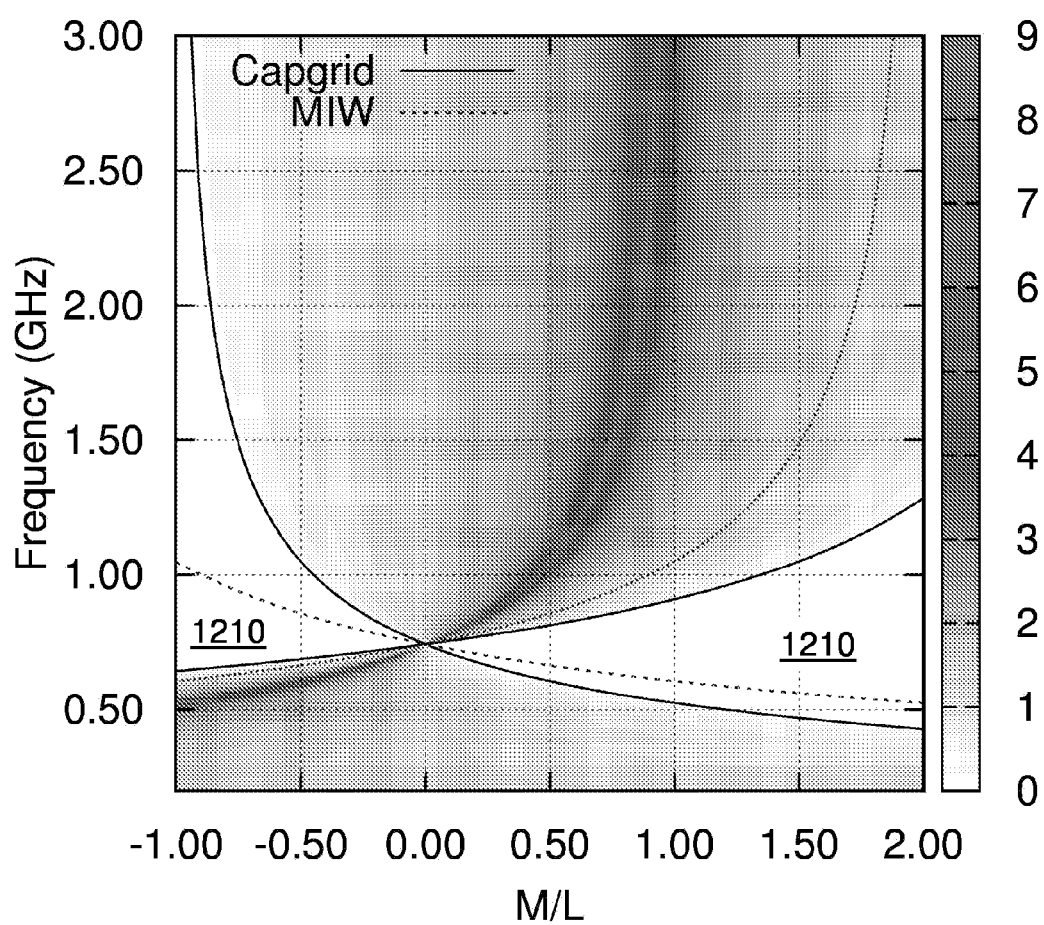
FIG. 12 shows the effective bandwidth of arrangements according to FIGS. 1 and 2.

For a planar structure, as the mutual inductance is negative, the overall effect is to have increased coupling between nearest neighbours. FIG. 12 shows the effective bandwidth. The white region 1210 being the frequencies for which propagation is possible in a 1D structure. At a coupling constant of M/L=−0.7 corresponding to the maximum realizable in plane mutual inductance for the square structure of FIG. 2, the bandwidth for the arrangement of FIG. 2, shown by solid lines, is nearly twice that of the arrangement of FIG. 1, shown broken lines. At this point the bandwidth of the FIG. 2 arrangement is 97% of its centre frequency making this a truly ultrawideband channel.

An advantage of embodiments of the invention is that power is not required to be supplied to the waveguide in order for it to function. Nor is a controller necessarily required in order to control signals to be transmitted along a waveguide according to embodiments of the invention, unless so desired.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A magneto-inductive waveguide comprising a plurality of resonant elements, the plurality of resonant elements including:
   a first resonant element comprising a conductive loop broken by at least one capacitive gap, and a second resonant element comprising a conductive loop broken by at least one capacitive gap, the second resonant element magneto-inductively coupling with the first resonant element; wherein the first resonant element and second resonant element are conductively coupled, and the first resonant element has a size that is smaller than 1/20 times a wavelength of a free space electromagnetic wave having a frequency equal to a resonant frequency of the first resonant element and the plurality of resonant elements are arranged to propagate a magneto-inductive wave.

2. The magneto-inductive waveguide of claim 1, wherein the respective conductive loops of the first and second resonant elements have a common portion, whereby the first and second resonant elements are conductively coupled.

3. The magneto-inductive waveguide of claim 2, wherein the respective conductive loops of the first and second resonant elements have a common capacitive gap.

4. The magneto-inductive waveguide of claim 1, wherein the magneto-inductive waveguide is arranged such that there is essentially no coupling between the waveguide and free space radiation.

5. The magneto-inductive waveguide of claim 1, wherein the first resonant element has a size smaller than 1/30 times the wavelength of a free space electromagnetic wave having a frequency equal to the resonant frequency of the first resonant element.

6. The magneto-inductive waveguide of claim 5, wherein the first resonant element has a size around than 1/100 times the wavelength of a free space electromagnetic wave having a frequency equal to the resonant frequency of the first resonant element.

7. The magneto-inductive waveguide of claim 6, wherein the first resonant element has a size smaller than 1/150 times the wavelength of a free space electromagnetic wave having a frequency equal to the resonant frequency of the first resonant element.

8. The magneto-inductive waveguide of claim 1 wherein neither of the first or second resonant elements are coupled to a ground plane.

9. The magneto-inductive waveguide of claim 1 comprising conductors arranged along lines of a grid, the conductors defining the plurality of resonant elements, wherein the conductors meet at nodes where lines of the grid intersect, and capacitive gaps are formed in the conductors between pairs of adjacent nodes such that the adjacent nodes are not joined by a conductive path.

10. The magneto-inductive waveguide of claim 9, wherein the conductors define the shape of the resonant elements to be one of: square, rectangular or triangular.

11. The magneto-inductive waveguide of claim 1, wherein the plurality of resonant elements are arranged to propagate at least one of power or data by the magneto-inductive wave.

12. The magneto-inductive waveguide of claim 11 having a dispersion relation given by $$\cos h(/f) = 2 \, Z/(Z - j\omega M)$$

where / is the propagation constant, d is period of the plurality of resonant elements, Z is the impedance of each resonant element, co is the angular frequency of the magneto-inductive wave, M is the mutual inductance between the resonant elements, and $j = \sqrt{-1}$.

13. The magneto-inductive waveguide of claim 11, wherein the plurality of resonant elements are arranged to be magneto-inductively coupleable to a resonant element of an external device, such that the at least one of power or data may be transferred between the magneto-inductive waveguide and the external device.

* * * * *